United States Patent
Lowenberg et al.

(10) Patent No.: US 11,037,191 B2
(45) Date of Patent: Jun. 15, 2021

(54) METHOD AND SYSTEM FOR REAL-TIME MEASUREMENT OF CAMPAIGN EFFECTIVENESS

(71) Applicant: MasterCard International Incorporated, Purchase, NY (US)

(72) Inventors: Todd Christian Lowenberg, Redding, CT (US); Serge Bernard, Danbury, CT (US); Adam Michael Granoff, San Francisco, CA (US); Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 421 days.

(21) Appl. No.: 15/284,909

(22) Filed: Oct. 4, 2016

(65) Prior Publication Data
US 2018/0096381 A1 Apr. 5, 2018

(51) Int. Cl.
*G06Q 30/02* (2012.01)
*G06F 16/29* (2019.01)

(52) U.S. Cl.
CPC ......... *G06Q 30/0246* (2013.01); *G06F 16/29* (2019.01)

(58) Field of Classification Search
CPC ..................................... G06Q 30/0207–0277
See application file for complete search history.

(56) References Cited

U.S. PATENT DOCUMENTS

| | | | | |
|---|---|---|---|---|
| 2002/0169658 A1* | 11/2002 | Adler | ................ | G06Q 30/0205 705/7.28 |
| 2014/0180826 A1* | 6/2014 | Boal | ................. | G06Q 30/0245 705/14.66 |
| 2016/0042388 A1* | 2/2016 | Chater | ............... | G06Q 30/0246 705/14.45 |

OTHER PUBLICATIONS

U.S. Appl. No. 62/183,955, entitled "Method and System for Estimating Residence Latitude and Longitude with Transaction Data", filed Jun. 24, 2015, by Serge Bernard et al.

* cited by examiner

*Primary Examiner* — Chrystina E Zelaskiewicz
(74) *Attorney, Agent, or Firm* — Buchanan Ingersoll & Rooney PC

(57) ABSTRACT

A method for real-time measurement of campaign effectiveness includes: storing device profiles, each including a hashed device identifier, geographic location, and transaction entries including a transaction date and transaction data; receiving a data request including a start date, end date, merchant identifier, a plurality of device identifiers, and, for each device identifier, a category identifier of a set of category identifiers; generating a hashed identifier for each of the device identifiers; identifying, a device profile for each hashed device identifier; calculating purchase behaviors for each category based on transaction data in transaction data entries that include a transaction date between the start date and end date that are included in each identified device profile that is associated with the respective category and includes a geographic location corresponding to the merchant identifier; and transmitting at least one of: the calculated purchase behaviors and one or more metrics based thereon.

20 Claims, 6 Drawing Sheets

METHOD AND SYSTEM FOR REAL-TIME MEASUREMENT OF CAMPAIGN EFFECTIVENESS

FIELD

The present disclosure relates to the real-time measurement of effectiveness of a campaign, specifically the correlation of transaction data to computing devices associated therewith for use in determining campaign effectiveness for a campaign exposed to known computing devices, and where identification of the computing devices may be obscured as to provide protection against user privacy and identification of the computing devices.

BACKGROUND

Determining the effectiveness of a marketing campaign can present a number of difficulties, particularly with the widespread use of various communication technologies by consumers. Traditionally, paper or other physical advertisements were sent or otherwise displayed to consumers, with effectiveness only being measured generally by overall changes in spending on the related products or at the related merchant. With the rise of the Internet and other computing devices, the effectiveness of an advertisement is often determined based on the number of users that interact with that advertisement, and, in some instances, the amount of users that continue on to make a related purchase if such data is available.

However, such methods are only effective in instances where a consumer uses the same avenue for purchase as the avenue used to present the advertisement to the consumer. As a result, traditional methods may be ineffective for measuring the effectiveness for an advertisement campaign when the use of a mixture of computing device and physical exposure or transaction occurs, or when a consumer uses multiple computing devices. For example, a consumer may be exposed to an advertisement on a mobile computing device, but may elect to make a corresponding purchase at a physical storefront without use of the mobile device. In another example, a consumer may browse the Internet on a smart phone and seen advertisement for a product, but may move to a desktop computer to actually make the purchase. In each instance, there is a disconnect between the distribution of the advertisement to the consumer, and the consumer's purchase that prohibits the correlation of the purchase to the advertisement, and, therefore, measurement of the effectiveness of the advertisement based on the technology being used.

Thus, there is a need for a technical solution for the development of a technological system that can measure the effectiveness of an advertisement campaign that is distributed to a plurality of computing devices, where the measurement is not tied to actions taken using the computing devices themselves, to account for a wide array of actions that may involve the computing devices as well as additional avenues of purchase.

SUMMARY

The present disclosure provides a description of systems and methods for the real-time measurement of campaign effectiveness. As discussed herein, embodiments for the real-time measurement of campaign effectiveness utilize associations between computing devices and geographic locations, and the associations of processed transactions to computing devices based on geographic location and other factors, to determine the effectiveness of an advertising campaign based on transactions occurring in a geographic area.

A method for real-time measurement of campaign effectiveness includes: storing, in a device database of a processing server, a plurality of device profiles, wherein each device profile includes a structured data set related to a computing device including at least a hashed device identifier, an associated geographic location, and a plurality of transaction data entries, each transaction data entry including data related to a payment transaction including at least a transaction date and transaction data; receiving, by a receiving device of the processing server, a data signal superimposed with a data file from a computing system, wherein the data file includes data related to a campaign including at least, a start date, an end date, at least one merchant identifier, a plurality of device identifiers, and, for each device identifier, a category identifier of a set of category identifiers; generating, by a hashing module of the processing server, a hashed identifier for each of the plurality of device identifiers included via application of a hashing algorithm to the respective device identifier; executing, by a querying module of the processing server, a query on the device database to identify, for each of the plurality of device identifiers, a corresponding device profile where the included hashed device identifier corresponds to the hashed identifier generated for the respective device identifier; calculating, by a calculation module of the processing server, at least one purchase behavior for each category identifier of the set of category identifiers for each of the at least one merchant identifiers, wherein each purchase behavior is based on at least the transaction data stored in one or more transaction data entries that include a transaction date between the start date and end date that are included in each corresponding device profile identified for device identifiers of the plurality of device identifiers where the device identifier is associated with the respective category identifier and where the corresponding device profile includes an associated geographic location corresponding to the respective merchant identifier; and electronically transmitting, by a transmitting device of the processing server, a data signal superimposed with a response data file to the computing system, wherein the response data file includes at least one of: the at least one purchase behavior calculated for each category identifier for each of the at least one merchant identifiers, and one or more metrics based on the at least one purchase behavior calculated for each category identifier for each of the at least one merchant identifiers.

A system for real-time measurement of campaign effectiveness includes: a device database of a processing server configured to store a plurality of device profiles, wherein each device profile includes a structured data set related to a computing device including at least a hashed device identifier, an associated geographic location, and a plurality of transaction data entries, each transaction data entry including data related to a payment transaction including at least a transaction date and transaction data; a receiving device of the processing server configured to receive a data signal superimposed with a data file from a computing system, wherein the data file includes data related to a campaign including at least, a start date, an end date, at least one merchant identifier, a plurality of device identifiers, and, for each device identifier, a category identifier of a set of category identifiers; a hashing module of the processing server configured to generate a hashed identifier for each of the plurality of device identifiers included via application of a hashing algorithm to the respective device identifier; a querying module of the processing server configured to execute a query on the device database to identify, for each of the plurality of device identifiers, a corresponding device profile where the included hashed device identifier corresponds to the hashed identifier generated for the respective device identifier; a calculation module of the processing server configured to calculate at least one purchase behavior for each category identifier of the set of category identifiers for each of the at least one merchant identifiers, wherein each purchase behavior is based on at least the transaction data stored in one or more transaction data entries that include a transaction date between the start date and end date that are included in each corresponding device profile identified for device identifiers of the plurality of device identifiers where the device identifier is associated with the respective category identifier and where the corresponding device profile includes an associated geographic location corresponding to the respective merchant identifier; and a transmitting device of the processing server configured to electronically transmit a data signal superimposed with a response data file to the computing system, wherein the response data file includes at least one of: the at least one purchase behavior calculated for each category identifier for each of the at least one merchant identifiers, and one or more metrics based on the at least one purchase behavior calculated for each category identifier for each of the at least one merchant identifiers.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
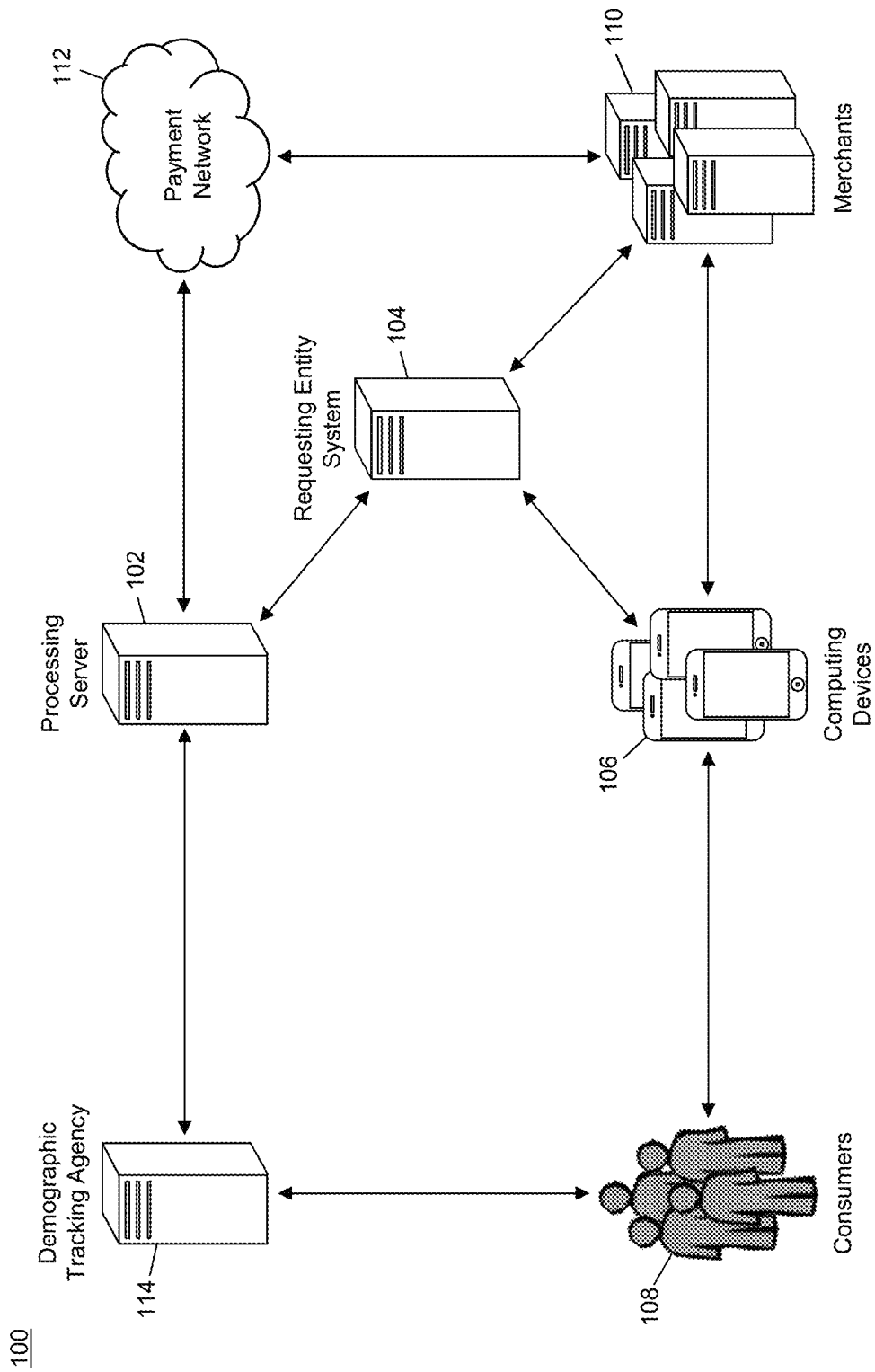
FIG. 1 is a block diagram illustrating a high level system architecture for the real-time measurement of campaign effectiveness in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

System for Real-Time Measurement of Campaign Effectiveness

FIG. 1 illustrates a system 100 for the real-time measurement of the effectiveness of an advertising campaign based on geographic location and transaction data, including the correlation of transaction data to computing devices.

The system 100 may include a processing server 102. The processing server 102, discussed in more detail below, may be configured to provide real-time measurements of the effectiveness of an advertising campaign in a geographic location based on purchase behaviors identified for transaction data, where the transaction data may associated with payment transactions that are tied to computing devices in the same geographic location. The processing server 102 may receive a data signal electronically transmitted by a requesting entity system 104 that is superimposed or otherwise encoded with a campaign measurement request. The data signal may be electronically transmitted to the processing server 102 using any suitable communication network and method, such as a local area network, wireless area network, radio frequency network, cellular communication network, or the Internet.

The campaign measurement request may be supplied by the requesting entity system 104, which may be a computing system associated with a requesting entity, which may be any entity that may request measurements related to the effectiveness of an advertising or other distributed campaign. For example, the requesting entity may be an advertising agency, research firm, product developer, retailer, etc. The campaign measurement request may include at least a start date and end date for the campaign, a merchant identifier associated with the campaign, and a plurality of device identifiers. The merchant identifier may be any value associated with the campaign that may be directly associated with a merchant or associated with a product or other item associated with a merchant. For example, the merchant identifier may be a merchant name, merchant category code, product identifier, or geographic location.

The device identifiers may be unique values associated with computing devices 106. Computing devices 106 may be any type of computing device suitable for receiving the advertisements or other content distributed by the requesting entity system 104 or an entity associated therewith (e.g., the requesting entity may be separate from the entity distributing the content), such as a desktop computer, laptop computer, notebook computer, tablet computer, cellular phone, smart phone, smart watch, smart television, wearable computing device, implantable computing device, etc. Device identifiers may be unique values associated therewith suitable for use in the identification thereof, which may include, for example, media access control addresses, internet protocol addresses, telephone numbers, usernames, e-mail addresses, registration numbers, serial numbers, identification numbers, etc.

In some embodiments, the campaign measurement request may also include, for each of the device identifiers, a category identifier out of a set of category identifiers. Each category identifier may be associated with a category to which the corresponding device identifier is applicable. Category identifiers may be associated with, for example, a test group and a control group, a control group and groups exposed to one of three different advertisements, etc. In some instances, category identifiers may be a generic value where such an association is not known to the processing server 102. For example, the category identifiers associated with device identifiers included in the campaign measurement request may be values 1, 2, and 3, with their associations not provided to the processing server 102 but known to the requesting entity system 104.

The processing server 102 may receive the campaign measurement request, and may generate a hashed identifier corresponding to each of the device identifiers. The hashed identifier may be generated via the application of one or more hashing algorithms to a device identifier, which may generate the corresponding hashed identifier. In some embodiments, the processing server 102 may hash the device identifiers upon receipt such that the device identifiers are not retained. In such embodiments, the processing server 102 may use hashing algorithms known to the requesting entity system 104. In some cases, the requesting entity system 104 may include hashed device identifiers in the campaign measurement request, such that the identifiers received by the processing server 102 may not be identifiable of any specific computing device 106.

The processing server 102 may be configured to measure the effectiveness of the campaign indicated in the campaign measurement request in real-time. The measurement of effectiveness in real-time may refer to herein as the immediate or near immediate initiation of the processes of the processing server 102 discussed herein to measure the effectiveness of the campaign using updated data, as opposed to batch processing or the measurement of effectiveness using historical data. The measurement of the effectiveness of the campaign may be based on purchase behaviors that are associated with each category identifier included in the set of category identifiers, as provided in the campaign measurement request.

In the system 100, a plurality of consumers 108 may be associated with various computing devices 106, which may include computing devices 106 whose corresponding device identifiers are included in the campaign measurement request. Each consumer 108 may conduct payment transactions with one or more merchants 110 using the computing devices 106. Each payment transaction involving a consumer 108 and a merchant 110 may be processed via a payment network 112. The processing of payment transactions by a payment network 112 may include the receipt of a transaction message related to the payment transaction via payment rails associated with the payment network 112 from a merchant 110 or an entity associated therewith, such as an acquiring financial institution or gateway processor. Transaction messages may be specially formatted data message formatted pursuant to one or more standards governing the exchange of financial transaction messages, such as the International Organization of Standardization's ISO 8583 or 20022 standards. Transaction messages may include a plurality of data elements configured to store data associated therewith, such as data elements configured to store transaction amounts, transaction times, transaction dates, geographic locations, merchant data, product data, offer data, loyalty data, reward data, point of sale data, issuer data, acquirer data, etc. The exchange of transaction messages and processing of payment transactions therewith is discussed in more detail below with respect to the process 500 illustrated in FIG. 5.

The payment network 112 may electronically transmit transaction data to the processing server 102 for use in the methods and systems discussed herein. In some embodiments, the payment network 112 may electronically transmit transaction messages for processed payment transactions to the processing server 102, which may be electronically transmitted via payment rails associated with the payment network 112 or any other suitable communication network and method. In other embodiments, the payment network 112 may electronically transmit the transaction data via other data messages, which may be formatted in alternative, suitable formats. In some cases, the processing server 102 may be a part of the payment network 112 and may receive the transaction data via internal communication networks and methods, and may also be received as part of the processing of the related payment transactions. In some embodiments, transaction data may be provided to the processing server 102 in real-time or near real-time, such that campaign effectiveness measurements provided by the processing server 102 are up to date with respect to conducted payment transactions.

Transaction data received from the payment network 112 may include, for each payment transaction, at least a transaction date and additional transaction data, such as a transaction amount, transaction time, merchant category code, geographic location, merchant identification number, merchant name, product data, etc. The transaction data for each payment transaction may also include an account identifier. The account identifier may be an identification value associated with the transaction account used to fund the payment transaction. The account identifier may be a primary account number, or may be a value associated therewith that may not be identifiable of the account number by the processing server 102, such as a hash value generated via application of one or more hashing algorithms to the account number or a tokenized value corresponding to the account number. In such instances, the tokenization or hashing may be performed by the processing server 102 upon receipt of the transaction data, or may be performed by the payment network 112 prior to the forwarding of the transaction data.

The transaction data for a payment transaction may also include a device identifier. The device identifier may be associated with the computing device 106 used to initiate the payment transaction, which may be captured as part of the traditional methods for processing payment transactions involving computing devices. In some embodiments, the payment network 112 and/or processing server 102 may be configured to hash the device identifier such that the transaction data provided to the processing server 102 includes only hashed device identifiers.

The processing server 102 may receive the transaction data and may be configured to associate payment transactions with device identifiers and associated device identifiers with geographic locations. The association of payment transactions with device identifiers may include identifying transaction data for payment transactions that include a device identifier, as well as identifying other payment transactions (e.g., with no device identifier included) that include the same account identifier included in those having the device identifier. The processing server 102 may also be configured to identify a geographic location for account identifiers and device identifiers based on the geographic location included in related payment transactions. The processing server 102 may identify account identifiers and device identifiers that have the same geographic location associated therewith to create a correspondence thereto. The processing server 102 may then associate all payment transactions with an account identifier with the corresponding device identifier, which may thus include the association of in-person and other payment transactions not conducted via a computing device 106, or conducted via a different computing device 106. Additional information regarding the identification of a geographic location for a transaction account and for a computing device involved in payment transactions is discussed in more detail in U.S. Provisional Patent Application No. 62/183,955, entitled "Method and System for Estimating Residence Latitude and Longitude with Transaction Data," filed on Jun. 24, 2015, by Serge Bernard et al., which is herein incorporated by reference in its entirety.

For each of the device identifiers included in the campaign measurement request, the processing server 102 may identify the transaction data related to payment transactions associated therewith. As discussed above, the transaction data may include payment transactions conducted using the computing device 106 associated with the device identifier, as well as other payment transactions associated with the same consumer 108 and/or transaction account, which may include payment transactions conducted without the use of a computing device 106. As a result, the methods and systems discussed herein may enable the processing server 102 to measure campaign effectiveness that takes into account multiple avenues for transacting beyond the one used to distribute the campaign.

The processing server 102 may be configured to calculate one or more purchase behaviors for each category provided in the campaign measurement request. The purchase behaviors may be calculated based on the transaction data for each payment transaction that is associated with a device identifier that is associated with the respective category identifier, which may be for payment transactions specific to the campaign being measured. Such payment transactions may be those with transaction dates occurring between the start and end dates for the campaign. In some cases, the payment transactions may include a merchant identifier corresponding to the merchant identifier included in the campaign measurement request. In other cases, purchase behaviors may only be calculated using transaction data associated with device identifiers that have geographic locations corresponding to the merchant identifier (e.g., if a geographic location, or a geographic location associated with the supplied merchant identifier) included in the campaign measurement request.

Purchase behaviors may include consumer behaviors associated with payment transaction that may be identified based on the data associated therewith, including the average transaction spend, transaction frequency, number of transactions, propensity to spend, propensity to spend a specific transaction amount or beyond a specific threshold amount, etc., and may be identified for one or more criteria associated with payment transactions, such the calculation of a purchase behavior for a specific geographic location, merchant, product, day of the week, time of day, other criteria, or a combination thereof. For instance, the processing server 102 may calculate purchase behaviors for each category that includes the average transaction spend, transaction frequency, and number of transactions on the whole for each device identifier, as well as those same three behaviors for each device identifier for the merchant industry identified in the campaign measurement request for a period of time before the campaign start date, for the campaign period, for a period of time after the campaign period, and the same purchase behaviors for a specific merchant identified in the campaign measurement request.

The processing server 102 may use the purchase behaviors to identify one or more metrics for providing to the requesting entity system 104. The one or more metrics may be based on the purchase behaviors and, in some instances, may be identified for each category identifier. The metrics may include the purchase behaviors themselves or summaries thereof and may include a campaign effectiveness value. The campaign effectiveness value may be based on a comparison of the purchase behaviors calculated for each of the identified categories. For instance, in the above example, the purchase behaviors may be calculated for a category of device identifiers exposed to the campaign and a control group not explicitly exposed to the campaign, where the processing server 102 may calculate a campaign effectiveness value by analyzing the changes in spend and frequency for each device identifier deliberately exposed to the campaign for the targeted merchant as compared to that merchant industry in general for each device identifier, as also compared to the same behaviors for those in the control group. In an example, the processing server 102 may identify a high effectiveness value if the purchase behaviors indicate a large growth in average spend at the particular merchant that goes beyond the growth for that industry by the device identifiers in the test group that is not seen for the device identifiers in the control group.

The processing server 102 may electronically transmit a data signal back to the requesting entity system 104 using the suitable communication network and method that is superimposed or otherwise encoded with the purchase behaviors and/or identified metrics, which may include the campaign effectiveness value. The requesting entity system 104 may then act accordingly based on the data. For example, if the categories include test groups for three different advertisements, the requesting entity system 104 may launch a campaign centered on the most effective advertisement.

In some embodiments, the processing server 102 may also incorporate demographic characteristics in the purchase behavior and metric calculations. In such embodiments, the processing server 102 may receive demographic characteristics for consumer 108 from a demographic tracking agency 114. The demographic tracking agency 114 may be configured to identify demographic characteristics for consumers 108 using suitable methods, and may associate the demographic characteristics with transaction accounts. The demographic tracking agency 114 may electronically transmit a data signal to the processing server 102 using a suitable method that is superimposed or otherwise encoded with associations between transaction accounts (e.g., using account numbers or account identifiers, which may be hashed account numbers generated using the same hashing algorithm as the processing server 102) and demographic characteristics. The demographic characteristics may include, for example, gender, age, income, occupation, education, residential status, marital status, familial status, etc.

In such embodiments, the processing server 102 may calculate purchase behaviors for each combination of category and demographic characteristic. In some such embodiments, the requesting entity system 104 may indicate in the campaign measurement request the demographic characteristics to use. In some instances, the categories themselves may be demographic characteristics or may incorporate demographic characteristics. For example, the campaign measurement request may include category identifiers and associated device identifiers for a male test audience, a female test audience, a male control audience, and a female control audience. In some instances, the device identifiers may not be associated with demographic characteristics in the campaign measurement request, but may be associated therewith by the processing server 102 based on the data received from the demographic tracking agency 114. For example, the requesting entity system 104 may provide device identifiers for test and control audiences, and may request separation by gender, which may be performed by the processing server 102. In such instances, the requesting entity system 104 may receive demographic-specific information, without the need to gather demographic data by use of the processing server 102.

The methods and systems discussed herein enable the processing server 102 to measure the effectiveness of a campaign in real-time or near real-time, which takes into account all payment transactions associated with a computing device 106, including payment transactions not conducted directly with that computing device 106, which may be conducted via an alternative computing device 106 or an entirely different payment method. As a result, the measurements provided by the processing server 102 using the technological system discussed herein may be more accurate, and thus more effective and valuable, than those provided in traditional systems. In addition, the use of demographic characteristics may further enhance the value of the metrics and measurements provided by the processing server 102 using the methods and systems discussed herein.

Processing Server

Figure 2:
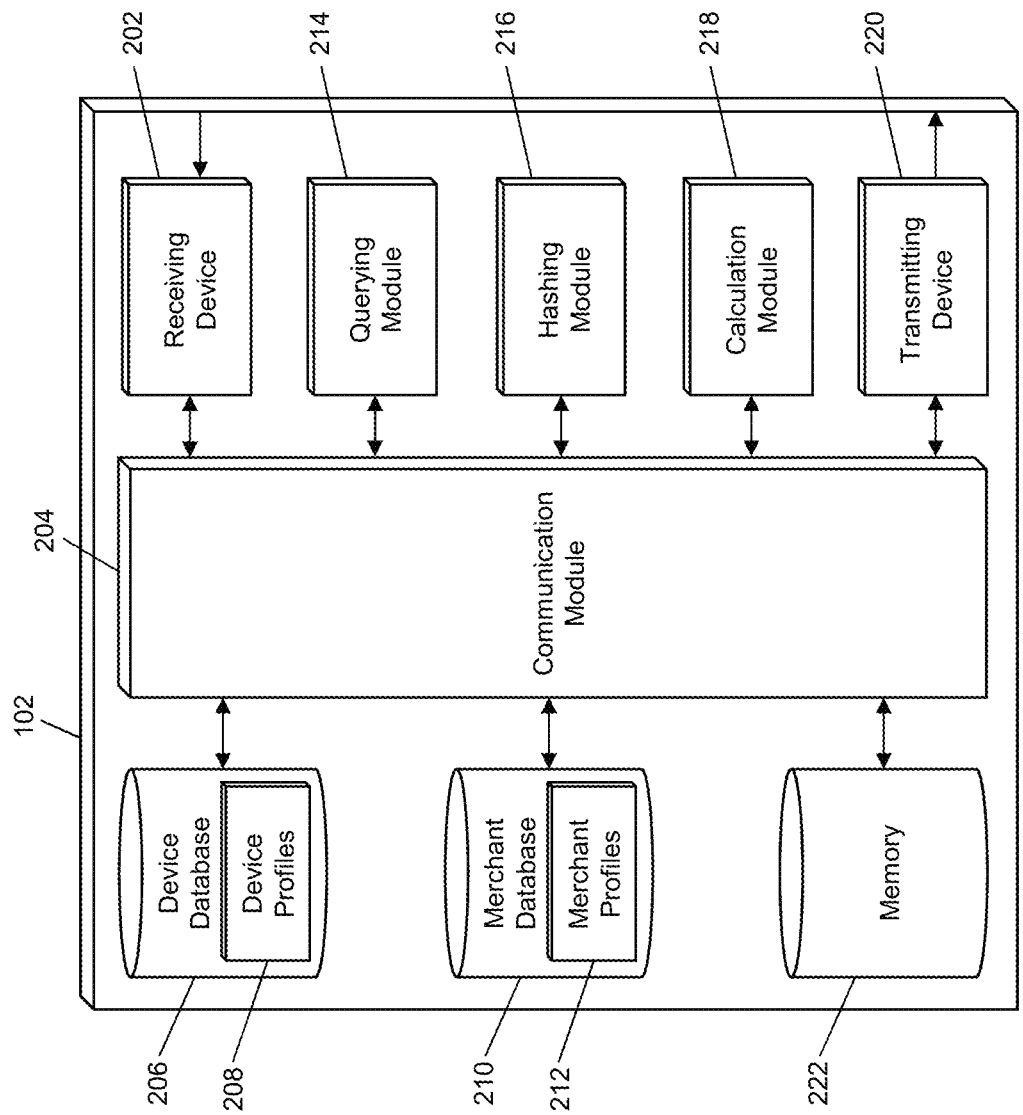
FIG. 2 is a block diagram illustrating the processing server of FIG. 1 for the real-time measurement of campaign effectiveness based on geographic location and transaction data in accordance with exemplary embodiments.

FIG. 2 illustrates an embodiment of a processing server 102 of the processing system 102 in the system 100. It will be apparent to persons having skill in the relevant art that the embodiment of the processing server 102 illustrated in FIG. 2 is provided as illustration only and may not be exhaustive to all possible configurations of the computing systems 200 of the processing system 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from requesting entity systems 104, payment networks 112, demographic tracking agencies 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 112 via payment rails associated therewith that may be superimposed or otherwise encoded with transaction messages. Transaction messages may be formatted pursuant to one or more standards, such as the ISO 8583 or 20022 standards, and include a message type indicator and a plurality of data elements, such as data elements configured to store primary account numbers, transaction amounts, merchant identifiers, transaction times and/or dates, device identifiers, and additional transaction data. In some instances, transaction data may be formatted in alternative data messages, which may be received via the payment rails associated with the payment network 112 or a suitable alternative communication network. The receiving device 202 may also be configured to receive data signals electronically transmitted by requesting entity systems 104, which may be superimposed or otherwise encoded with campaign measurement requests. Campaign measurement requests may include at least a start date, an end date, a merchant identifier, a plurality of device identifiers, and, for each device identifier an associated category identifier for one of a group of categories. In some embodiments, the receiving device 202 may also be configured to receive data signals electronically transmitted by demographic tracking agencies 114, which may be superimposed or otherwise encoded with associations between demographic characteristics and account numbers or identifiers.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, hashing module 216, calculation module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a device database 206. The device database 206 may be configured to store a plurality of device profiles 208 using a suitable data storage format and schema. The device database 206 may be a relational database that utilizes structured query language for the storage, identification, modifying, updating, accessing, etc. of structured data sets stored therein. Each device profile 208 may be a structured data set configured to store data related to a computing device 106. Each device profile 208 may include at least a hashed device identifier associated with the related computing device, a geographic location associated therewith, and a plurality of transaction data entries. Each transaction data entry may be related to a payment transaction associated with the related computing device and include at least a transaction date and additional transaction data. In some embodiments, each transaction data entry may be a transaction message formatted pursuant to one or more standards, such as the ISO 8583 or 20022 standards. In some instances, a device profile 208 may also include a plurality of demographic characteristics associated therewith.

In some embodiments, the processing server 102 may also include a merchant database 210. The merchant database 210 may be configured to store a plurality of merchant profiles 212 using a suitable data storage format and schema. The merchant database 210 may be a relational database that utilizes structured query language for the storage, identification, modifying, updating, accessing, etc. of structured data sets stored therein. Each merchant profile 212 may be a structured data set configured to store data related to one or more merchants 110. Each merchant profile 212 may include at least a merchant identifier and an associated merchant geographic location. In such embodiments, the merchant identifier included in a campaign measurement request (e.g., received via the receiving device 202) may not be a geographic location. In such embodiments, the merchant identifier may be a unique value associated with a specific merchant 110 or merchant industry, such as a merchant identification number, merchant category code, etc.

The processing server 102 may include a querying module 214. The querying module 214 may be configured to execute queries on databases to identify information. The querying module 214 may receive one or more data values or query strings, and may execute a query string based thereon on an indicated database, such as the device database 206, to identify information stored therein. The querying module 214 may then output the identified information to an appropriate engine or module of the processing server 102 as necessary. The querying module 214 may, for example, execute a query on the device database 206 to identify a device profile 208 for each hashed device identifier included in a received campaign measurement request. In another example, the querying module 214 may execute a query on the merchant database 210 to identify a merchant profile 212 that includes a merchant identifier included in a received campaign measurement request.

The processing server 102 may also include a hashing module 216. The hashing module 216 may be configured to generate hash values for use in performing the functions of the processing server 102 as discussed herein. Hash values may be generated via the application of one or more hashing algorithms to data. The hashing module 216 may receive data to be hashed as input, may generate a hash value via hashing of the data, and may output the resulting hash value to another module or engine of the processing server 102. In some instances, the input may also include the one or more hashing algorithms to be used by the hashing module 216, or the hashing module 216 may be configured to identify the one or more hashing algorithms to use. The hashing module 216 may be configured to, for example, hash device identifiers and account numbers received by the receiving device 202 upon receipt such that the underlying device identifiers and account numbers are not possessed by the processing server 102.

The processing server 102 may also include a calculation module 218. The calculation module 218 may be configured to calculate purchase behaviors and metrics based on transaction data. The calculation module 218 may receive a plurality of transaction data entries and one or more requested purchase behaviors and/or metrics as input, may calculate the requested purchase behaviors and/or metrics based on transaction data included in each transaction data entry related thereto, and may output the results to another module or engine of the processing server 102. For example, the calculation module 218 may receive a plurality of transaction data entries associated with a specific category identifier and set of demographic characteristics (e.g., as identified via the querying module 214) as well as a metric for calculation (e.g., such as may be requested in the campaign measurement request), and may calculate the requested metric based on the transaction data included in the transaction data entries, and may output the requested metric for transmission back to the requesting entity system 104.

The processing server 102 may also include a transmitting device 220. The transmitting device 220 may be configured to transmit data over one or more networks via one or more network protocols. In some embodiments, the transmitting device 220 may be configured to transmit data over the payment rails, such as using specially configured infrastructure associated with payment networks 112 for the transmission of transaction messages that include sensitive financial data and information, such as identified payment credentials. In some instances, the transmitting device 220 may be configured to transmit data to requesting entity systems 104, payment networks 112, demographic tracking agencies 114, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to requesting entity systems 104 that are superimposed or otherwise encoded with calculated purchase behaviors and/or metrics. The transmitting device 220 may also be configured to electronically transmit data signals superimposed or otherwise encoded with data requests, such as may be transmitted to the payment network 112 (e.g., requesting transaction data for specific transaction accounts and/or device identifiers) or the demographic tracking agency 114 (e.g., requesting demographic characteristics for specific transaction accounts).

The processing server 102 may also include a memory 222. The memory 222 may be configured to store data for use by the processing server 102 in performing the functions discussed herein. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein.

Process for Real-Time Measurement of Campaign Effectiveness

Figure 3:
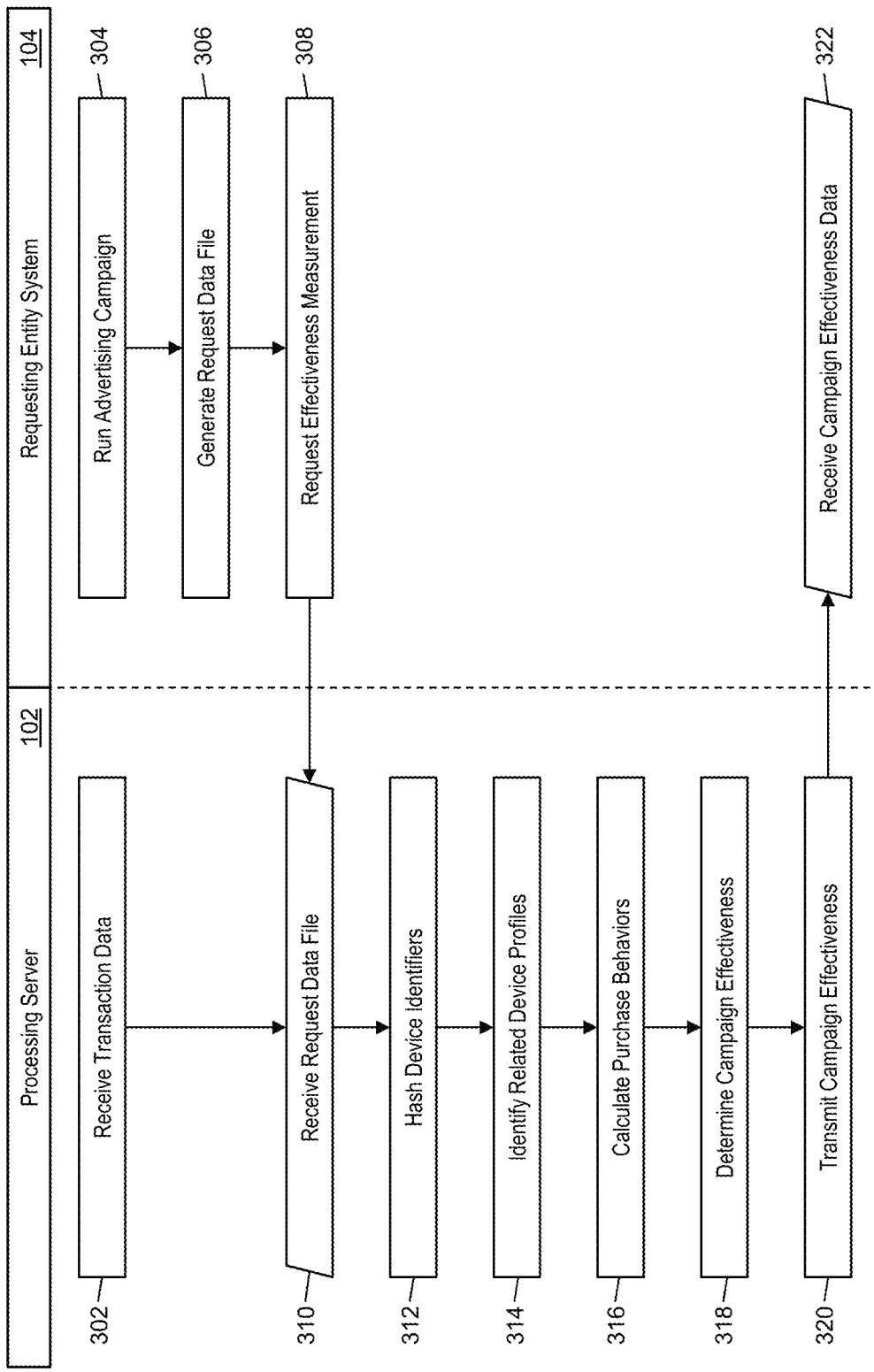
FIG. 3 is a flow diagram illustrating a process for the real-time measurement of the effectiveness of an advertising campaign using the system of FIG. 1 in accordance with exemplary embodiments.

FIG. 3 illustrates a process 300 for the real-time measurement of the effectiveness of a campaign based on purchase behaviors associated with computing devices 106 that takes into account payment transactions not directly associated with each computing device 106.

In step 302, the receiving device 202 of the processing server 102 may receive transaction data for a plurality of payment transactions. The transaction data may be included in transaction data entries or transaction messages electronically transmitted by one or more payment networks 112. The transaction data for each payment transaction may be associated with a hashed device identifier and include at least a transaction date and additional transaction data. The association with a device identifier may be indicated in the transmission from the payment network 112, or may be identified by the processing server 102 using methods and systems that will be apparent to persons having skill in the relevant art. The additional transaction data may include a transaction amount, geographic location, transaction time, merchant identifier, merchant data, point of sale data, product data, offer data, loyalty data, reward data, issuer data, acquirer data, etc. The querying module 214 of the processing server 102 may execute one or more queries on the device database 206 to store the received transaction data in device profiles 208 that include the respective hashed device identifier.

In step 304, the requesting entity system 104 or an entity associated therewith my run an advertising campaign. The advertising campaign may include the distribution of advertisements to a plurality of computing devices 106 for which the associated device identifiers are known, and may also include the identification of computing devices 106 that are not deliberately exposed to the advertisements. The requesting entity system 104 may identify a plurality of different categories of computing devices 106 involved in the campaign. In step 306, the requesting entity system 104 may generate a request data file to request a measurement of effectiveness of the campaign. The request data file may include each of the device identifiers associated with the computing devices 106 involved in the campaign and, for each device identifier, a category identifier associated with one of a plurality of categories, and may also include a start and end date for the campaign, and a merchant identifier associated with a target of the campaign. The merchant identifier may be, for example, a geographic location, a merchant identification number, or a merchant category code. In some embodiments, the request may also indicate one or more purchase behaviors and/or metrics that are requested.

In step 308, the requesting entity system 104 may electronically transmit a data signal to the processing server 102 that is superimposed or otherwise encoded with the generated request data file to request the measurement of campaign effectiveness. The data signal may be electronically transmitted using any suitable communication network and method and, in step 310, may be received by the receiving device 202 of the processing server 102. In step 312, the hashing module 216 of the processing server 102 may hash each of the device identifiers included in the request data file via the application of one or more hashing algorithms thereto. In some embodiments, step 312 may be performed during the receipt of the request data file in step 310 such that the processing server 102 does not possess the unhashed device identifiers.

In step 314, the querying module 214 of the processing server 102 may execute a query on the device database 206 of the processing server 102 to identify a device profile 208 related to each of the device identifiers included in the request data file, where the device profile 208 includes the corresponding hashed identifier. In some embodiments, the processing server 102 may only identify the device profiles 208 that also include a geographic location that corresponds to the merchant identifier included in the request data file. In instances where the merchant identifier may not be a geographic location, the querying module 214 may execute a query on the merchant database 210 to identify a merchant profile 212 that includes the merchant identifier, for identification of the geographic location stored therein, which may be used for filtering of the device profiles 208.

In step 316, the calculation module 218 of the processing server 102 may calculate a plurality of purchase behaviors. The purchase behaviors may be calculated for each category of device identifiers as indicated in the request data file, and, if applicable, may be further specific to combinations of categories and demographic characteristics. The purchase behaviors for each category may be calculated based on the transaction data included in one of more of the transaction data entries stored in one or more of the identified device profiles 208 where the corresponding device identifier is associated with the respective category identifier. In instances where demographic characteristics are used, the transaction data entries may be include in device profiles 208 that include the respective demographic characteristics. In some embodiments, the purchase behaviors may be indicated in the request data file or based thereon, such as the calculation module 218 calculating a specific set of purchase behaviors necessary to identify a metric requested by the requesting entity system 104.

In an example, the requesting entity system 104 may request a campaign effectiveness value for a campaign targeted towards men between the ages of 25 and 34, with device identifiers for control and test audiences supplied. The purchase behaviors may thus be identified for test and control audiences broken down by gender and age group, including a test and control audience for men between the ages of 25 and 34, and at least one test and control audience for all other demographic characteristics, which may also be broken up into one or more gender/age groups. For instance, the purchase behaviors may also be calculated for test and control groups of men under 25 and men above 34, and women for each of the three age groups. The purchase behaviors calculated in such an example may include transaction frequency and average spend overall, in the merchant industry, and at the specific merchant identified in the request data file. Such purchase behaviors may be based on at least the transaction amount, merchant category code, and merchant identification number stored in each transaction data entry.

In step 318, the calculation module 218 of the processing server 102 may calculate a campaign effectiveness value. The campaign effectiveness value may be calculated based on a comparison of the purchase behaviors calculated for each of the groups indicated in the request data file. For instance, in the above example, the calculation module 218 may compare the spend levels and transaction frequency for the group of men between the ages of 25 and 34 to those in each of the other groups, to determine if any change in spend amount or transaction frequency is unique to men of that age group, that age group specifically, men specifically, or experienced in both genders and multiple age groups. In some instances, multiple campaign effectiveness values may be identified by the calculation module 218. For instances, in the above example, the calculation module 218 may determine a high effectiveness in the target age group, but may also identify that the same age group for women has also experience an increase in spend amount and transaction frequency, and may generate an effectiveness value accordingly.

In step 320, the transmitting device 220 of the processing server 102 may electronically transmit a data signal to the requesting entity system 104 that is superimposed or otherwise encoded with the calculated campaign effectiveness value or values, and, if applicable, one or more of the calculated purchase behaviors. In step 322, the requesting entity system 104 may receive the campaign effectiveness value and may perform one or more actions accordingly. For instance, in the above example, the requesting entity system 104 may begin to target both men and women between the ages of 25 and 34 with their advertising campaign due to the measured effectiveness.

Exemplary Method for Real-Time Measurement of Campaign Effectiveness

Figure 4:
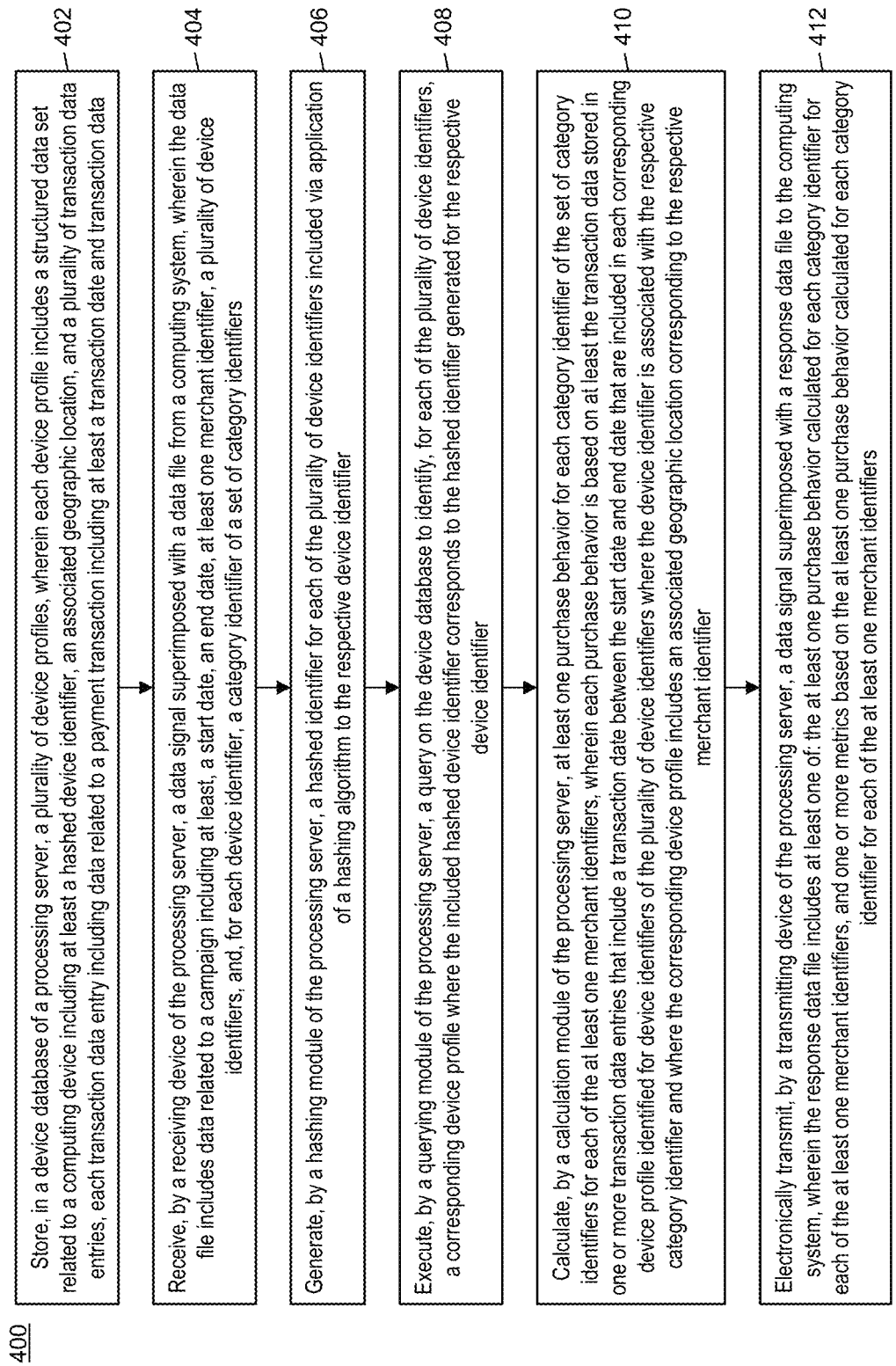
FIG. 4 is a flow chart illustrating an exemplary method for real-time measurement of campaign effectiveness in accordance with exemplary embodiments.

FIG. 4 illustrates a method 400 for the real-time measurement of campaign effectiveness based on computing devices and associated geographic locations, and transaction data directly or indirectly associated therewith.

In step 402, a plurality of device profiles (e.g., device profiles 208) may be stored in a device database (e.g., the device database 206) of a processing server (e.g., the processing server 102), wherein each device profile includes a structured data set related to a computing device (e.g., a computing device 106) including at least a hashed device identifier, an associated geographic location, and a plurality of transaction data entries, each transaction data entry including data related to a payment transaction including at least a transaction date and transaction data. In step 404, a data signal superimposed with a data file may be received by a receiving device (e.g., the receiving device 202) of the processing server from a computing system (e.g., the requesting entity system 104), wherein the data file includes data related to a campaign including at least, a start date, an end date, at least one merchant identifier, a plurality of device identifiers, and, for each device identifier, a category identifier of a set of category identifiers.

In step 406, a hashed identifier may be generated for each of the plurality of device identifiers included in the received data file by a hashing module (e.g., the hashing module 216) of the processing server via application of one or more hashing algorithms to the respective device identifier. In step 408, a query may be executed by a querying module (e.g., the querying module 214) of the processing server 102 on the device database to identify, for each of the plurality of device identifiers, a corresponding device profile where the included hashed device identifier corresponds to the hashed identifier generated for the respective device identifier.

In step 410, at least one purchase behavior may be calculated by a calculation module (e.g., the calculation module 218) of the processing server for each category identifier of the set of category identifiers for each of the at least one merchant identifiers, wherein each purchase behavior is based on at least the transaction data stored in one or more transaction data entries that include a transaction date between the start date and end date that are included in each corresponding device profile identified for device identifiers of the plurality of device identifiers where the device identifier is associated with the respective category identifier and where the corresponding device profile includes an associated geographic location corresponding to the respective merchant identifier. In step 412, a data signal superimposed with a response data file may be electronically transmitted by a transmitting device (e.g., the transmitting device 220) of the processing server to the computing system, wherein the response data file includes at least one of: the at least one purchase behavior calculated for each category identifier for each of the at least one merchant identifiers, and one or more metrics based on the at least one purchase behavior calculated for each category identifier for each of the at least one merchant identifiers.

In one embodiment, the method 400 may further include calculating, by the calculation module of the processing server, a campaign effectiveness value for the campaign based on a comparison, for each of the at least one merchant identifier, of the at least one purchase behavior calculated for each category identifier for the respective at least one merchant identifier, wherein the one or more metrics includes the calculated campaign effectiveness value. In a further embodiment, the set of category identifiers may include a test group identifier and a control group identifier. In one embodiment, each of the at least one merchant identifiers may be a geographic location associated with one or more merchants. In some embodiments, the one or more metrics may include at least one of: change in average spend, change in total spend, change in transaction frequency, and change in number of transactions.

In one embodiment, the method 400 may also include: storing, in a merchant database (e.g., the merchant database 210) of the processing server, a plurality of merchant profiles (e.g., merchant profiles 212), wherein each merchant profile includes a structured data set related to a merchant including at least a merchant identifier and a merchant geographic location; and executing, by the querying module of the processing server, a query on the merchant database to identify, for each of the at least one merchant identifier, a corresponding merchant profile that includes the respective merchant identifier, wherein the correspondence between the associated geographic location included in a device profile and a merchant identifier is based on a correspondence between the associated geographic location and the merchant geographic location included in the merchant profile corresponding to the respective merchant identifier. In a further embodiment, the merchant identifier may be one of: a merchant identification number and a merchant name.

In some embodiments, each account profile may further includes one or more demographic characteristics of a set of demographic characteristics, the at least one purchase behavior calculated for each category identifier of the set of category identifiers for each of the at least one merchant identifiers may be calculated for each demographic characteristic of the set of demographic characteristics, and the at least one purchase behavior may be based on the transaction data stored in one or more transaction data entries included in a corresponding device profile where the included one or more demographic characteristics include the respective demographic characteristic. In a further embodiment, the data file may further include the set of demographic characteristics. In another further embodiment, the method 400 may further include calculating, by the calculation module of the processing server, a campaign effectiveness value for the campaign based on a comparison, for each of the at least one merchant identifier and demographic characteristic, of the at least one purchase behavior calculated for each category identifier for the respective at least one merchant identifier and demographic characteristic, wherein the one or more metrics includes the calculated campaign effectiveness value.

Payment Transaction Processing System and Process

Figure 5:
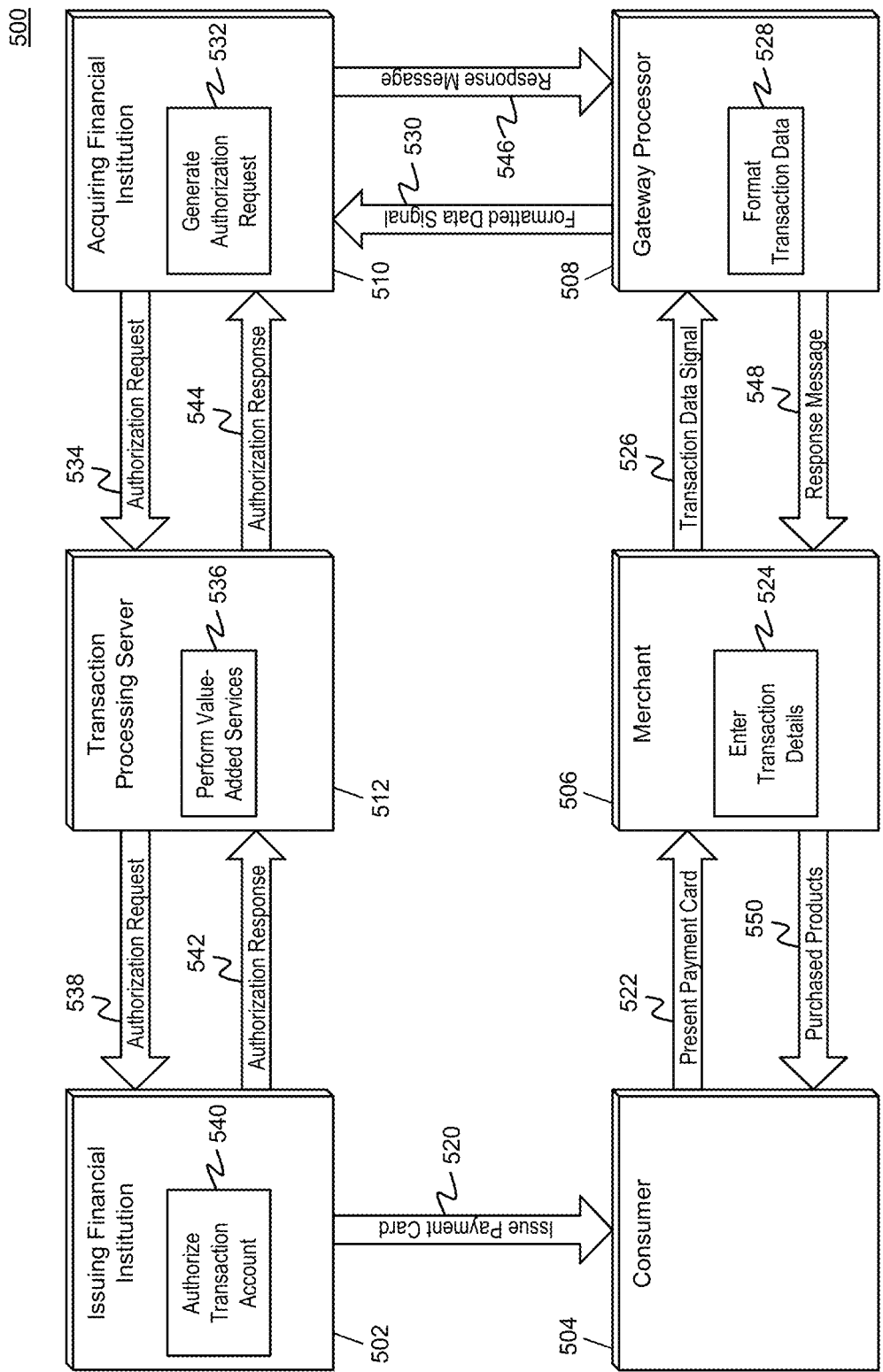
FIG. 5 is a flow diagram illustrating the processing of a payment transaction in accordance with exemplary embodiments.

FIG. 5 illustrates a transaction processing system and a process 500 for the processing of payment transactions in the system, which may include the processing of thousands, millions, or even billions of transactions during a given period (e.g., hourly, daily, weekly, etc.). The process 500 and steps included therein may be performed by one or more components of the system 100 discussed above, such as the processing server 102, consumers 108, computing devices 106, merchants 110, payment network 112, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3 and 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
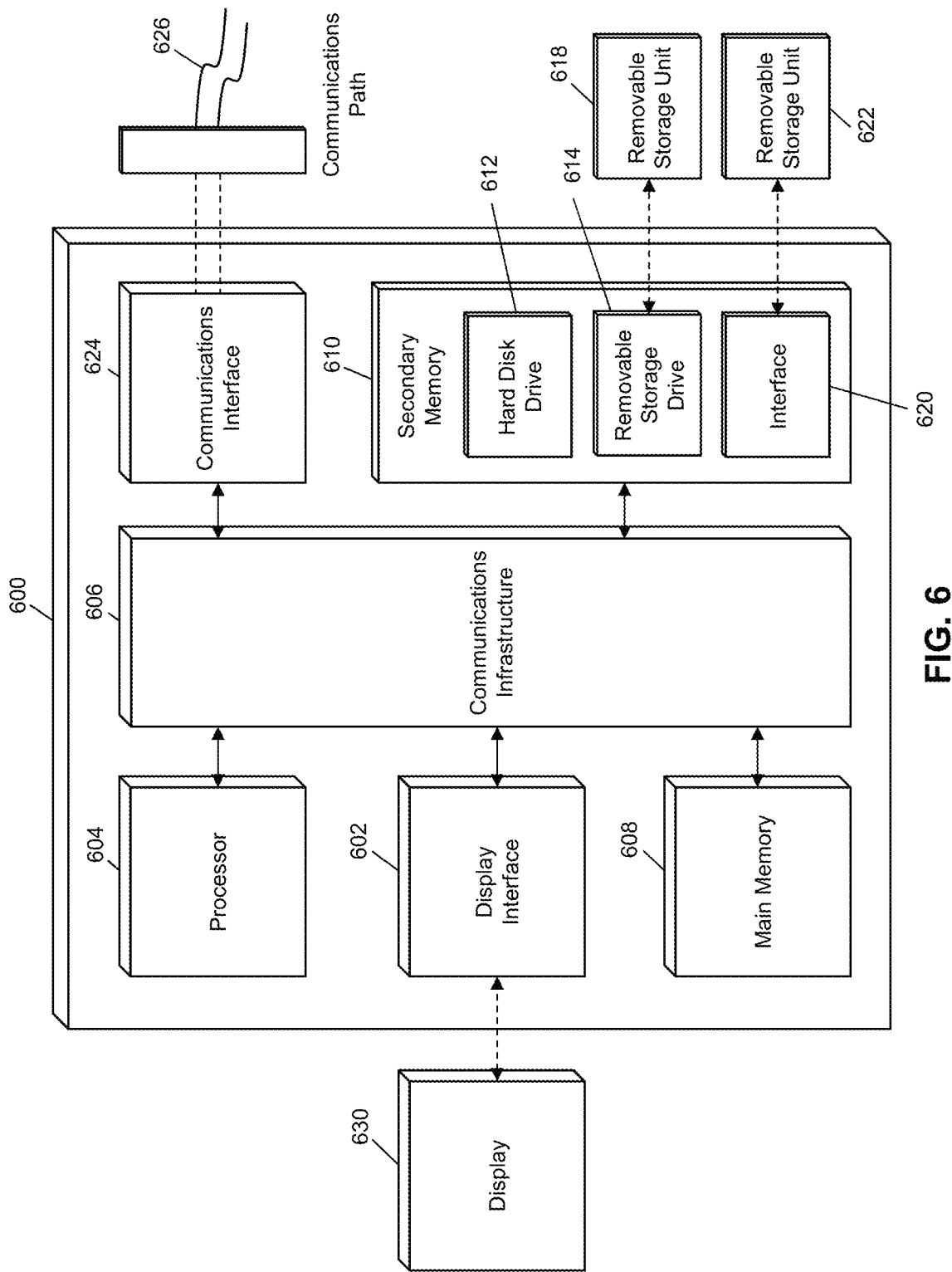
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for real-time measurement of campaign effectiveness. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for real-time measurement of campaign effectiveness, comprising:

storing, in a device database of a processing server, a plurality of device profiles, wherein each device profile includes a structured data set related to a computing device including at least a hashed device identifier, an associated geographic location, and a plurality of transaction data entries, each transaction data entry including data related to a payment transaction including at least, an account identifier, a transaction date, and transaction data;

receiving, by a receiving device of the processing server, a data signal superimposed with a data file from a computing system, wherein the data file includes data related to a current campaign including at least, a start date, an end date, at least one merchant identifier, and a plurality of first device identifiers involved in the current campaign, and, for each first device identifier, a category identifier of a set of category identifiers to which a respective first device identifier is applied;

generating, by a hashing module of the processing server, a hashed identifier for each of the plurality of first device identifiers included via application of a hashing algorithm to the respective first device identifier;

executing, by a querying module of the processing server, a query on the device database to identify, for each of the plurality of first device identifiers, a corresponding device profile where the included hashed device identifier corresponds to the hashed identifier generated for the respective first device identifier;

calculating, by a calculation module of the processing server, at least one purchase behavior for each category identifier of the set of category identifiers for each of the at least one merchant identifiers, each category identifier defining at least: one or more groups associated with the first device identifiers and second device identifiers; and whether each of the one or more groups is exposed to the current campaign, the at least one purchase behavior including at least one or more of: average transaction spend, transaction frequency, and number of transactions, wherein each purchase behavior is based on at least:

first transaction data obtained from one or more first transaction data entries associated with one or more computing devices included in the plurality of device profiles, the one or more first transaction data entries include an account identifier of a respective first device profile and a first transaction date between the start date and end date of the current campaign included in each corresponding device profile identified for device identifiers of the plurality of first device identifiers where the first device identifier is associated with the respective category identifier, and the account identifier associated with a respective device profile, and where the corresponding device profile includes an associated geographic location corresponding to the respective merchant identifier;

second transaction data obtained from one or more second transaction data entries associated with one or more payment devices not included in the plurality of device profiles, the one or more second transaction data entries including the account identifier of a respective second device profile and a second transaction date between the start date and end date of the current campaign included in each corresponding device profile identified for device identifiers of the plurality of first device identifiers, and the one or more second transaction data entries also include the account identifier of the respective second device profile; and third transaction data obtained from one or more third transaction data entries associated with the one or more payment devices not included in the plurality of device profiles, the one or more third transaction data entries including a third transaction date between the start date and end date of the current campaign, which are included in each corresponding device profile identified for device identifiers of a plurality of second device identifiers; and electronically transmitting, by a transmitting device of the processing server, a data signal superimposed with a response data file associated with the current campaign to the computing system, wherein the response data file includes: the at least one purchase behavior calculated for each category identifier for each of the at least one merchant identifiers, and one or more metrics based on the at least one purchase behavior calculated for each category identifier for each of the at least one merchant identifiers, at least one of the one or more metrics being a value which rates industry growth for a specified category identifier based on purchase behavior of the first device identifiers generating the first transaction data and purchase behavior of the one or more payment devices not included in the plurality of device profiles as compared to purchase behavior of the second device identifiers generating the third transaction data, the data signal superimposed with the response data file being formatted according to a standard specified by the computing system for initiating one or more actions in the computing system, wherein the transmitting device selects one of a plurality of different communication channels based on one or more of availability and congestion for transmitting the data signal superimposed with the response data.

2. The method of claim 1, further comprising:
calculating, by the calculation module of the processing server, a campaign effectiveness value for the campaign based on a comparison, for each of the at least one merchant identifier, of the at least one purchase behavior calculated for each category identifier for the respective at least one merchant identifier, the comparison producing at least one value representative of one or more differences between the set of category identifiers, wherein the one or more metrics includes the calculated campaign effectiveness value.

3. The method of claim 2, wherein the set of category identifiers includes a test group identifier and a control group identifier.

4. The method of claim 1, wherein each of the at least one merchant identifiers is a geographic location associated with one or more merchants.

5. The method of claim 1, further comprising:
storing, in a merchant database of the processing server, a plurality of merchant profiles, wherein each merchant profile includes a structured data set related to a merchant including at least the merchant identifier and a merchant geographic location; and executing, by the querying module of the processing server, a query on the merchant database to identify, for each of the at least one merchant identifier, a corresponding merchant profile that includes the respective merchant identifier, wherein the correspondence between the associated geographic location included in a device profile and a merchant identifier is based on a correspondence between the associated geographic location and the merchant geographic location included in the merchant profile corresponding to the respective merchant identifier.

6. The method of claim 5, wherein the merchant identifier is one of: a merchant identification number and a merchant name.

7. The method of claim 1, wherein the one or more metrics includes at least one of: change in average spend, change in total spend, change in transaction frequency, and change in number of transactions.

8. The method of claim 1, wherein
each device profile further includes one or more demographic characteristics of a set of demographic characteristics, the at least one purchase behavior calculated for each category identifier of the set of category identifiers for each of the at least one merchant identifiers are calculated for each demographic characteristic of the set of demographic characteristics, and the at least one purchase behavior is based on the first transaction data and the second transaction data, wherein the included one or more demographic characteristics include the respective demographic characteristic.

9. The method of claim 8, wherein the data file further includes the set of demographic characteristics.

10. The method of claim 8, further comprising:
calculating, by the calculation module of the processing server for each of the at least one merchant identifier and demographic characteristic, a campaign effectiveness value for the campaign based on a comparison of a plurality of purchase behaviors, wherein each purchase behavior is calculated for each category identifier for the respective at least one merchant identifier and demographic characteristic, the comparison producing at least one value representative of one or more differences between the set of category identifiers, wherein the one or more metrics includes the calculated campaign effectiveness value.

11. A system for real-time measurement of campaign effectiveness, comprising:
   a device database of a processing server stores a plurality of device profiles, wherein each device profile includes a structured data set related to a computing device including at least a hashed device identifier, an associated geographic location, and a plurality of transaction data entries, each transaction data entry including data related to a payment transaction including at least an account identifier, a transaction date, and transaction data;
   a receiving device of the processing server receives a data signal superimposed with a data file from a computing system, wherein the data file includes data related to a current campaign including at least, a start date, an end date, at least one merchant identifier, and a plurality of first device identifiers involved in the current campaign, and, for each first device identifier, a category identifier of a set of category identifiers to which a respective first device identifier is applied;
   a hashing module of the processing server generates a hashed identifier for each of the plurality of first device identifiers included via application of a hashing algorithm to the respective first device identifier;
   a querying module of the processing server executes a query on the device database to identify, for each of the plurality of first device identifiers, a corresponding device profile where the included hashed device identifier corresponds to the hashed identifier generated for the respective first device identifier;
   a calculation module of the processing server calculates at least one purchase behavior to determine one or more of an average transaction spend, transaction frequency, and number of transactions, the purchase behavior being calculated for each category identifier of the set of category identifiers for each of the at least one merchant identifiers, each category identifier defining at least: one or more groups associated with the first device identifiers and second device identifiers; and whether each of the one or more groups is exposed to the current campaign, wherein each purchase behavior is based on at least:
   first transaction data obtained from one or more first transaction data entries associated with one or more computing devices included in the plurality of device profiles, the one or more first transaction data entries include an account identifier of a respective device profile and a first transaction date between the start date and end date of the current campaign included in each corresponding device profile identified for device identifiers of the plurality of first device identifiers where the device identifier is associated with the respective category identifier, and the account identifier associated with a respective device profile, and where the corresponding device profile includes an associated geographic location corresponding to the respective merchant identifier; and
   second transaction data obtained from one or more second transaction data entries associated with one or more payment devices not included in the plurality of device profiles, the one or more second transaction data entries including the account identifier of a respective second device profile and a second transaction date between the start date and end date of the current campaign included in each corresponding device profile identified for device identifiers of the plurality of first device identifiers, and the one or more second transaction data entries also include the account identifier of the respective second device profile; and
   third transaction data obtained from one or more third transaction data entries associated with the one or more payment devices not included in the plurality of device profiles, the one or more third transaction data entries including a third transaction date between the start date and end date of the current campaign, which are included in each corresponding device profile identified for device identifiers of a plurality of second device identifiers; and
   a transmitting device of the processing server electronically transmits a data signal superimposed with a response data file associated with the current campaign to the computing system, wherein the response data file includes: the at least one purchase behavior calculated for each category identifier for each of the at least one merchant identifiers, and one or more metrics based on the at least one purchase behavior calculated for each category identifier for each of the at least one merchant identifiers, at least one of the one or more metrics being a value which rates industry growth for a specified category identifier based on purchase behavior of the first device identifiers generating the first transaction data and purchase behavior of the one or more payment devices not included in the plurality of device profiles as compared to purchase behavior of the second device identifiers generating the third transaction data, the data signal superimposed with the response data file being formatted according to a standard specified by the computing system for initiating one or more actions in the computing system, wherein the transmitting device is configured to electronically transmit by the data signal superimposed with the response data by selecting one of a plurality of different communication channels based on one or more of availability and congestion for transmitting.

12. The system of claim 11, wherein
   the calculation module of the processing server calculates, for each of the at least one merchant identifier, a campaign effectiveness value for the campaign based on a comparison of the at least one purchase behavior calculated for each category identifier for the respective at least one merchant identifier, the comparison producing at least one value representative of one or more differences between the set of category identifiers, and
   the one or more metrics includes the calculated campaign effectiveness value.

13. The system of claim 12, wherein the set of category identifiers includes a test group identifier and a control group identifier.

14. The system of claim 11, wherein each of the at least one merchant identifiers is a geographic location associated with one or more merchants.

15. The system of claim 11, further comprising:
   a merchant database of the processing server stores a plurality of merchant profiles, wherein each merchant profile includes a structured data set related to a merchant including at least the merchant identifier and a merchant geographic location, wherein the querying module of the processing server executes a query on the merchant database to identify, for each of the at least one merchant identifier, a corresponding merchant profile that includes the respective merchant identifier, and the correspondence between the associated geographic location included in a device profile and a merchant identifier is based on a correspondence between the associated geographic location and the merchant geographic location included in the merchant profile corresponding to the respective merchant identifier.

16. The system of claim 15, wherein the merchant identifier is one of: a merchant identification number and a merchant name.

17. The system of claim 11, wherein the one or more metrics includes at least one of: change in average spend, change in total spend, change in transaction frequency, and change in number of transactions.

18. The system of claim 11, wherein each device profile further includes one or more demographic characteristics of a set of demographic characteristics, the at least one purchase behavior calculated for each category identifier of the set of category identifiers for each of the at least one merchant identifiers are calculated for each demographic characteristic of the set of demographic characteristics, and the at least one purchase behavior is based on the first transaction data and the second transaction data, wherein the included one or more demographic characteristics include the respective demographic characteristic.

19. The system of claim 18, wherein the data file further includes the set of demographic characteristics.

20. The system of claim 18, wherein the calculation module of the processing server calculates a campaign effectiveness value for the campaign based on a comparison, for each of the at least one merchant identifier and demographic characteristic, of a plurality of purchase behaviors, wherein each purchase behavior is calculated for each category identifier for the respective at least one merchant identifier and demographic characteristic, and the one or more metrics includes the calculated campaign effectiveness value.

\* \* \* \* \*